(12) United States Patent
Zhou et al.

(10) Patent No.: US 9,531,470 B2
(45) Date of Patent: Dec. 27, 2016

(54) METHOD, SYSTEM, AND NODE DEVICE FOR MONITORING OPTICAL PERFORMANCE OF WAVELENGTH CHANNEL

(71) Applicant: HUAWEI TECHNOLOGIES CO., LTD., Shenzhen, Guangdong (CN)

(72) Inventors: Enbo Zhou, Shenzhen (CN); Sen Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 14/521,956

(22) Filed: Oct. 23, 2014

(65) Prior Publication Data

US 2015/0043906 A1 Feb. 12, 2015

Related U.S. Application Data

(63) Continuation of application No. PCT/CN2012/074969, filed on May 2, 2012.

(51) Int. Cl.
*H04B 10/00* (2013.01)
*H04B 10/079* (2013.01)
*H04J 14/02* (2006.01)
*H04B 10/077* (2013.01)
*H04J 14/00* (2006.01)

(52) U.S. Cl.
CPC ...... *H04B 10/0795* (2013.01); *H04B 10/0775* (2013.01); *H04J 14/0221* (2013.01); *H04J 14/0227* (2013.01); *H04J 14/0256* (2013.01); *H04J 14/02* (2013.01); *H04J 14/0271* (2013.01)

(58) Field of Classification Search
CPC .... H04B 10/07; H04B 10/073; H04B 10/0775
See application file for complete search history.

(56) References Cited

U.S. PATENT DOCUMENTS 6,009,220 A  12/1999  Chan et al.
7,321,727 B2  1/2008  Ng et al.
(Continued)

FOREIGN PATENT DOCUMENTS

CN  1411196   4/2003
CN  101088234   12/2007
(Continued)

OTHER PUBLICATIONS

Extended European Search Report dated Mar. 6, 2015 in corresponding European Patent Application No. 12761234.9.
(Continued)

*Primary Examiner* — Daniel Dobson
(74) *Attorney, Agent, or Firm* — Staas & Halsey LLP (57) ABSTRACT

Embodiments of the present invention relate to the field of network communications and specifically discloses a method for monitoring optical performance of a wavelength channel, including: receiving, by a first node, an optical signal over an operating wavelength and obtaining, by the first node, optical performance of the unestablished wavelength channel by monitoring the optical signal at a receiving end. Embodiments of the present invention further disclose a system and a node device for monitoring optical performance of a wavelength channel.

16 Claims, 5 Drawing Sheets

(56) References Cited

U.S. PATENT DOCUMENTS

| | | | |
|---|---|---|---|
| 7,330,651 B2 * | 2/2008 | Yamashita | ................ H01S 3/10 359/337.13 |
| 2003/0066953 A1 | 4/2003 | Kwon | |
| 2005/0286905 A1 | 12/2005 | Mohs et al. | |
| 2006/0140626 A1 | 6/2006 | Robinson et al. | |
| 2007/0065147 A1 | 3/2007 | Qiao et al. | |
| 2010/0166425 A1 | 7/2010 | Onaka | |
| 2012/0063771 A1 | 3/2012 | Sugaya et al. | |

FOREIGN PATENT DOCUMENTS

| | | |
|---|---|---|
| CN | 101141219 | 3/2008 |
| EP | 1865641 A1 | 12/2007 |
| WO | 01/47151 A1 | 6/2001 |

OTHER PUBLICATIONS

Chinese Office Action dated Aug. 13, 2014 in corresponding Chinese Patent Application No. 201280000574.8.
Chinese Search Report dated Aug. 5, 2014 in corresponding Chinese Patent Application No. 2012800005748.
PCT International Search Report dated Feb. 14, 2013 in corresponding International Patent Application No. PCT/CN2012/074969.

\* cited by examiner

METHOD, SYSTEM, AND NODE DEVICE FOR MONITORING OPTICAL PERFORMANCE OF WAVELENGTH CHANNEL

CROSS-REFERENCE TO RELATED APPLICATIONS

This application is a continuation of International Application No. PCT/CN2012/074969, filed on May 2, 2012, which is hereby incorporated by reference in its entirety.

TECHNICAL FIELD

Embodiments of the present invention relate to network communications technologies, and in particular, to a method, a system, and a node device for monitoring optical performance of a wavelength channel.

BACKGROUND

A wavelength division multiplexing network constitutes a basic physical layer of a communications network. As an important indicator of health of the wavelength division multiplexing network, optical performance of a wavelength channel is particularly important for design and maintenance of the wavelength division multiplexing network.

For an established wavelength channel, optical performance can be directly monitored at a node which the established wavelength channel passes through; but for an unestablished wavelength channel, optical performance also needs to be monitored, so as to ensure that after being established, the wavelength channel can satisfy a performance requirement of service subscription.

In the prior art, an external light source provides an optical signal for an unestablished wavelength channel, a virtual wavelength channel is established, and then optical performance is monitored at a node which the virtual wavelength channel passes through. However, in this method, the external light source brings about complexity and additional monitoring costs. Besides, an operating parameter of the external light source needs to be manually adjusted and therefore reliability is low, and dynamic monitoring of optical performance cannot be implemented.

SUMMARY

Embodiments of the present invention provide a method, a system, and a node device for monitoring optical performance of a wavelength channel, to solve problems of high technical costs and an incapability of implementing dynamic optical performance monitoring in the prior art.

The following technical solutions are adopted in the embodiments of the present invention:

One aspect of the present invention provides a method for monitoring optical performance of a wavelength channel, including:

receiving, by a first node, an optical signal over an operating wavelength of an unestablished wavelength channel, where the optical signal is obtained by a second node by using an optical amplifier to amplify a noise signal adjusted by a second variable optical attenuator, the adjusted noise signal is obtained by the second node by using the second variable optical attenuator to adjust optical power of a noise signal over the operating wavelength, the noise signal over the operating wavelength is obtained through filtering from an amplified spontaneous emission signal by the second node by using a tunable optical bandpass filter, and the amplified spontaneous emission signal is generated by the second node by using the optical amplifier; and obtaining, by the first node, optical performance of the unestablished wavelength channel by monitoring the optical signal at a receiving end.

Another aspect of the present invention provides a method for monitoring optical performance of a wavelength channel, including:

receiving, by a first node, an optical signal over an operating wavelength of an unestablished wavelength channel, where the optical signal is obtained by a second node by using an optical amplifier to amplify a noise signal adjusted by a second variable optical attenuator, the adjusted noise signal is obtained by the second node by using the second variable optical attenuator to adjust optical power of a noise signal over the operating wavelength, the noise signal over the operating wavelength is obtained through filtering from an amplified spontaneous emission signal by the second node by using a tunable optical bandpass filter, and the amplified spontaneous emission signal is generated by the second node by using the optical amplifier;

establishing, by the first node, a cross-connection of the unestablished wavelength channel;

adjusting, by the first node, optical power of the optical signal by using the first variable optical attenuator until a sending end of the first node detects the optical signal; and obtaining, by the first node, optical performance of the unestablished wavelength channel by monitoring the optical signal at the sending end.

Still another aspect of the present invention provides a method for monitoring optical performance of a wavelength channel, including:

generating, by a second node, an amplified spontaneous emission signal by using an optical amplifier;

obtaining, by the second node, a noise signal over an operating wavelength of an unestablished wavelength channel from the amplified spontaneous emission signal through filtering by using a tunable optical bandpass filter;

adjusting, by the second node, optical power of the noise signal over the operating wavelength by using a second variable optical attenuator until a condition is satisfied, where the condition includes: that the noise signal over the operating wavelength is detected by a monitoring port of the optical amplifier;

amplifying, by the second node by using the optical amplifier, the noise signal adjusted by the second variable optical attenuator, and obtaining an optical signal over the operating wavelength;

establishing, by the second node, a cross-connection of the unestablished wavelength channel;

adjusting, by the second node, optical power of the optical signal by using a third variable optical attenuator until a sending end of the second node detects the optical signal; and obtaining, by the second node, optical performance of the unestablished wavelength channel by monitoring the optical signal at the sending end.

Yet another aspect of the present invention provides a node device, including:

a first receiving unit, configured to receive an optical signal over an operating wavelength of an unestablished wavelength channel, where the optical signal is obtained by a second node device by using an optical amplifier to amplify a noise signal adjusted by a second variable optical attenuator, the adjusted noise signal is obtained by the second node device by using the second variable optical attenuator to adjust optical power of a noise signal over the operating wavelength, the noise signal over the operating wavelength is obtained through filtering from an amplified spontaneous emission signal by the second node device by using a tunable optical bandpass filter, and the amplified spontaneous emission signal is generated by the second node device by using the optical amplifier; and a first monitoring unit, configured to obtain optical performance of the unestablished wavelength channel by monitoring the optical signal at a receiving end.

Yet another aspect of the present invention provides a node device, including:

a first receiving unit, configured to receive an optical signal over an operating wavelength of an unestablished wavelength channel, where the optical signal is obtained by a second node device by using an optical amplifier to amplify a noise signal adjusted by a second variable optical attenuator, the adjusted noise signal is obtained by the second node device by using the second variable optical attenuator to adjust optical power of a noise signal over the operating wavelength, the noise signal over the operating wavelength is obtained through filtering from an amplified spontaneous emission signal by the second node device by using a tunable optical bandpass filter, and the amplified spontaneous emission signal is generated by the second node device by using the optical amplifier;

a first cross-connection unit, configured to establish a cross-connection of the unestablished wavelength channel;

a first variable optical attenuator, configured to adjust optical power of the optical signal and stop the adjustment when a valid first control signal is obtained; and a first monitoring unit, configured to: when a sending end of the node device detects the optical signal, generate the valid first control signal; and configured to obtain optical performance of the unestablished wavelength channel by monitoring the optical signal at the sending end.

Yet another aspect of the present invention provides a node device, including:

an optical amplifier, configured to generate an amplified spontaneous emission signal; and configured to amplify a noise signal adjusted by a second variable optical attenuator and obtain an optical signal over an operating wavelength of an unestablished wavelength channel;

a tunable optical bandpass filter, configured to obtain a noise signal over the operating wavelength from the amplified spontaneous emission signal through filtering;

a second variable optical attenuator, configured to adjust optical power of the noise signal over the operating wavelength until a second control signal is valid;

a second cross-connection unit, configured to establish a cross-connection of the unestablished wavelength channel;

a third variable optical attenuator, configured to adjust optical power of the optical signal until a third control signal is valid; and a second monitoring unit, configured to: when the noise signal over the operating wavelength is detected by a monitoring port of the optical amplifier, generate the valid second control signal; configured to: when a sending end of the node device detects the optical signal, generate the valid third control signal; and configured to obtain optical performance of the unestablished wavelength channel by monitoring the optical signal at the sending end.

Yet another aspect of the present invention provides a system for monitoring optical performance of a wavelength channel, at least including a first node device and a second node device, where the second node device is a sending node on an unestablished wavelength channel, and the first node device is a non-sending node on the unestablished wavelength channel, where the first node device is configured to receive an optical signal over an operating wavelength of the unestablished wavelength channel; and configured to obtain optical performance of the unestablished wavelength channel by monitoring the optical signal at a receiving end of the first node device; and the second node device is configured to generate an amplified spontaneous emission signal by using an optical amplifier; configured to obtain a noise signal over the operating wavelength from the amplified spontaneous emission signal through filtering by using a tunable optical bandpass filter; configured to adjust optical power of the noise signal over the operating wavelength by using a second variable optical attenuator until the noise signal over the operating wavelength is detected by a monitoring port of the optical amplifier; configured to amplify, by using the optical amplifier, the noise signal adjusted by the second variable optical attenuator, and obtain an optical signal over the operating wavelength; configured to establish a cross-connection of the unestablished wavelength channel; configured to adjust optical power of the optical signal by using the third variable optical attenuator until a sending end of the second node device detects the optical signal; and configured to: after the cross-connection of the unestablished wavelength channel is established, send the optical signal to an adjacent downstream node device.

Yet another aspect of the present invention provides a system for monitoring optical performance of a wavelength channel, where the system includes at least a first node device and a second node device, where the second node device is a sending node on an unestablished wavelength channel, and the first node device is a non-sending node on the unestablished wavelength channel, where the first node device is configured to receive an optical signal over an operating wavelength of the unestablished wavelength channel; configured to establish a cross-connection of the unestablished wavelength channel; configured to adjust optical power of the optical signal by using a first variable optical attenuator until a sending end of the first node device detects the optical signal; and configured to obtain optical performance of the unestablished wavelength channel by monitoring the optical signal at the sending end of the first node device; and the second node device is configured to generate an amplified spontaneous emission signal by using an optical amplifier; configured to obtain a noise signal over the operating wavelength from the amplified spontaneous emission signal through filtering by using a tunable optical bandpass filter; configured to adjust optical power of the noise signal over the operating wavelength by using a second variable optical attenuator until the noise signal over the operating wavelength is detected by a monitoring port of the optical amplifier; configured to amplify, by using the optical amplifier, the noise signal adjusted by the second variable optical attenuator, and obtain an optical signal over the operating wavelength; configured to establish a cross-connection of the unestablished wavelength channel; configured to adjust optical power of the optical signal by using a third variable optical attenuator until a sending end of the second node device detects the optical signal; and configured to: after the cross-connection of the unestablished wavelength channel is established, send the optical signal to an adjacent downstream node device.

In the method, the system, and the node device for monitoring optical performance of a wavelength channel provided by the embodiments of the present invention, no external light source needs to be added; by enhancing the noise signal over the operating wavelength of the unestablished wavelength channel, the optical signal over the operating wavelength of the unestablished wavelength channel is established for the unestablished wavelength channel; and a process of adjusting the optical power can be automatically completed. In this way, dynamic monitoring of the optical performance of the unestablished wavelength channel is implemented, and the implementation is simple and reliability is high.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a method, a system, and a node device for monitoring optical performance of a wavelength channel. To make the technical solutions of the present invention more comprehensible, the following describes the embodiments of the present invention in detail with reference to the accompanying drawings.

It should be made clear that the described embodiments are merely some embodiments of the present invention rather than all embodiments. All other embodiments obtained by a person of ordinary skill in the art based on the embodiments of the present invention without creative efforts shall fall within the protection scope of the present invention.

Figure 1A:
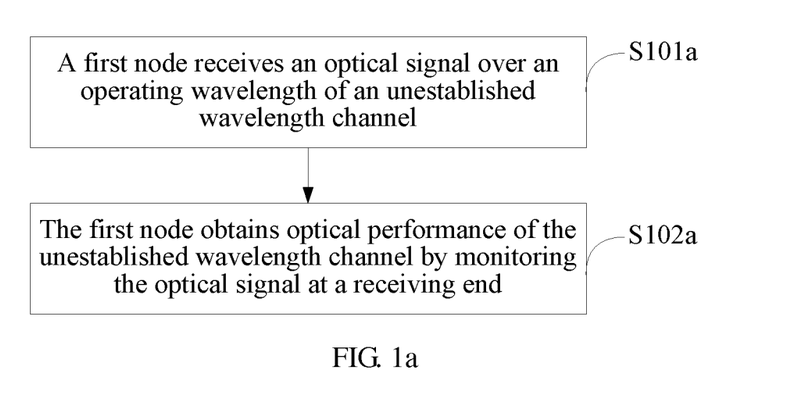
FIG. 1a is a flowchart of a method for monitoring optical performance of a wavelength channel according to an embodiment of the present invention.

In an embodiment of the present invention, a process of a method for monitoring optical performance of a wavelength channel is shown in FIG. 1a. The method includes the following steps:

Step S101a: A first node receives an optical signal over an operating wavelength of an unestablished wavelength channel, where the optical signal is obtained by a second node by using an optical amplifier to amplify a noise signal adjusted by a second variable optical attenuator, the adjusted noise signal is obtained by the second node by using the second variable optical attenuator to adjust optical power of a noise signal over the operating wavelength, the noise signal over the operating wavelength is obtained through filtering from an amplified spontaneous emission signal by the second node by using a tunable optical bandpass filter, and the amplified spontaneous emission signal is generated by the second node by using the optical amplifier.

Step S102a: The first node obtains optical performance of the unestablished wavelength channel by monitoring the optical signal at a receiving end.

Figure 1B:
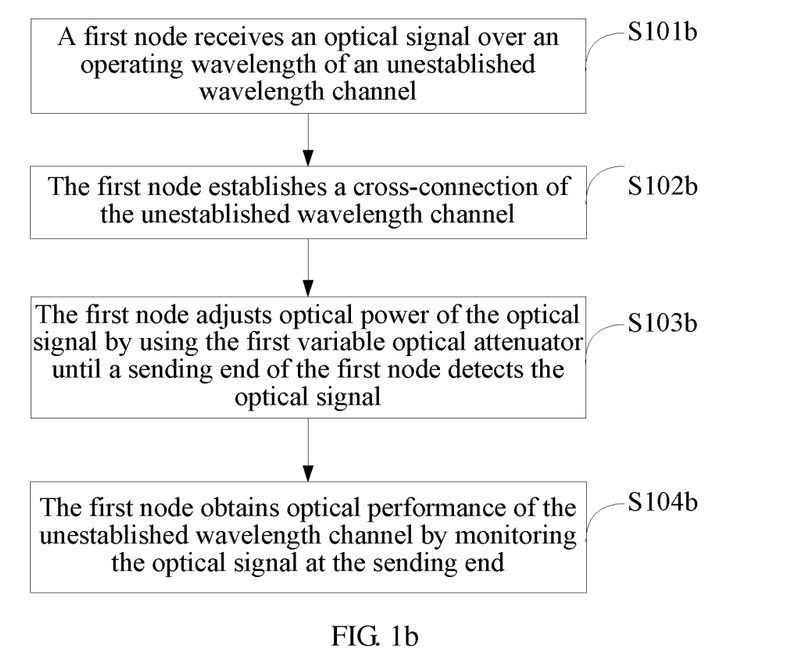
FIG. 1b is a flowchart of a method for monitoring optical performance of a wavelength channel according to another embodiment of the present invention.

In another embodiment of the present invention, a process of a method for monitoring optical performance of a wavelength channel is shown in FIG. 1b. The method includes the following steps:

Step S101b: A first node receives an optical signal over an operating wavelength of an unestablished wavelength channel, where the optical signal is obtained by a second node by using an optical amplifier to amplify a noise signal adjusted by a second variable optical attenuator, the adjusted noise signal is obtained by the second node by using the second variable optical attenuator to adjust optical power of a noise signal over the operating wavelength, the noise signal over the operating wavelength is obtained through filtering from an amplified spontaneous emission signal by the second node by using a tunable optical bandpass filter, and the amplified spontaneous emission signal is generated by the second node by using the optical amplifier.

Further, after the first node receives the optical signal, the first node may further obtain optical performance of the unestablished wavelength channel by monitoring the optical signal at a receiving end.

Step S102b: The first node establishes a cross-connection of the unestablished wavelength channel.

Step S103b: The first node adjusts optical power of the optical signal by using a first variable optical attenuator until a sending end of the first node detects the optical signal.

Further, if the first node adjusts the optical power of the optical signal to a maximum value, the sending end still does not detect the optical signal, and the first node may further send an adjustment signal to an adjacent upstream node, so that the adjacent upstream node adjusts the optical power of the optical signal to a larger value.

Step S104b: The first node obtains optical performance of the unestablished wavelength channel by monitoring the optical signal at the sending end.

Further, after the first node establishes the cross-connection of the unestablished wavelength channel, the first node may further send the optical signal to an adjacent downstream node.

Figure 1C:
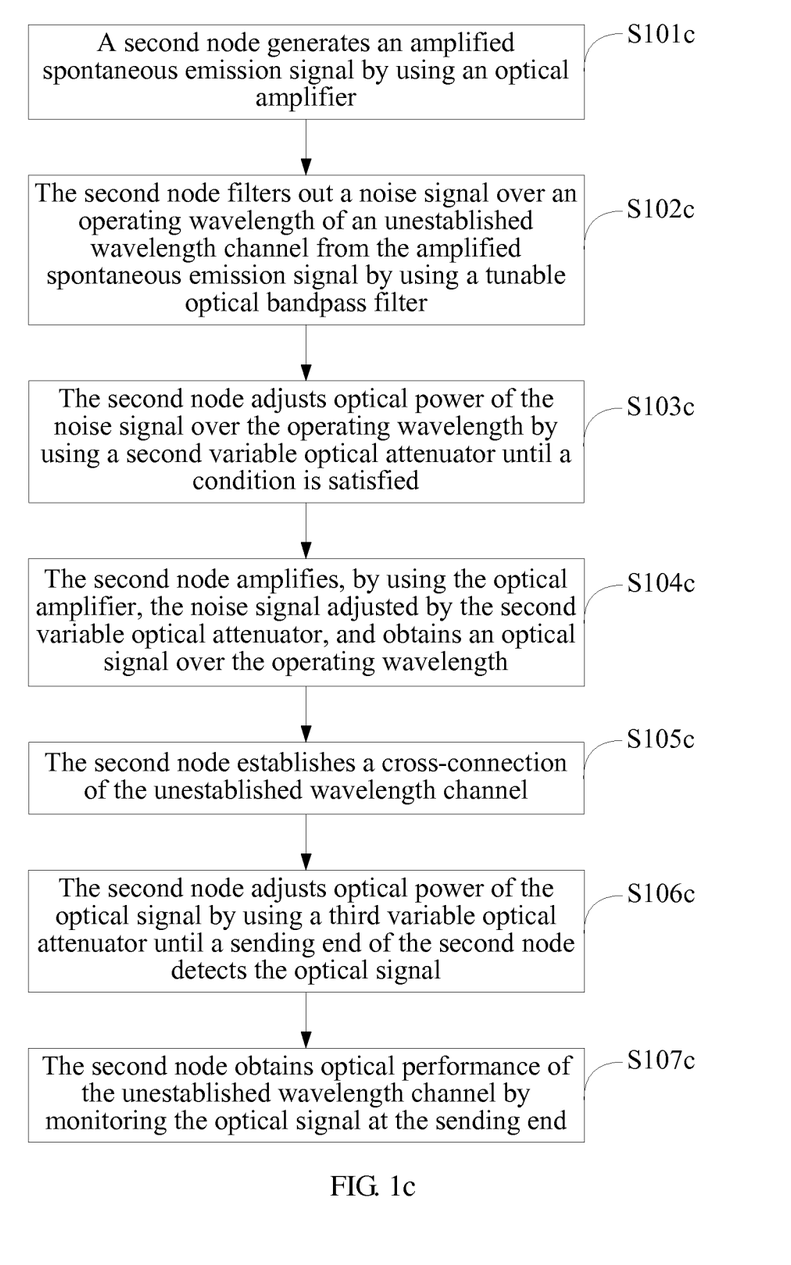
FIG. 1c is a flowchart of a method for monitoring optical performance of a wavelength channel according to still another embodiment of the present invention.

In still another embodiment of the present invention, a process of a method for monitoring optical performance of a wavelength channel is shown in FIG. 1c. The method includes the following steps:

Step S101c: A second node generates an amplified spontaneous emission signal by using an optical amplifier.

Step S102c: The second node obtains a noise signal over an operating wavelength of an unestablished wavelength channel from the amplified spontaneous emission signal through filtering by using a tunable optical bandpass filter.

Step S103c: The second node adjusts optical power of the noise signal over the operating wavelength by using a second variable optical attenuator until a condition is satisfied, where the condition includes: that the noise signal over the operating wavelength is detected by a monitoring port of the optical amplifier.

The foregoing condition may further include: that an optical signal noise ratio margin of a corresponding operating wavelength detected by a receiving node of an established wavelength channel passing through the second node is greater than a margin threshold.

Step S104c: The second node amplifies, by using the optical amplifier, the noise signal adjusted by the second variable optical attenuator, and obtains an optical signal over the operating wavelength.

Step S105c: The second node establishes a cross-connection of the unestablished wavelength channel.

Further, after the second node establishes the cross-connection of the unestablished wavelength channel, the second node sends the optical signal to an adjacent downstream node.

Step S106c: The second node adjusts optical power of the optical signal by using a third variable optical attenuator until a sending end of the second node detects the optical signal.

Step S107c: The second node obtains optical performance of the unestablished wavelength channel by monitoring the optical signal at the sending end.

The following describes a method, an apparatus, and a system for monitoring optical performance of a wavelength channel provided by embodiments of the present invention in detail with reference to accompanying drawings.

It should be made clear that the described embodiments are merely some embodiments of the present invention rather than all embodiments. All other embodiments obtained by a person of ordinary skill in the art based on the embodiments of the present invention without creative efforts shall fall within the protection scope of the present invention.

Embodiment 1

Figure 2:
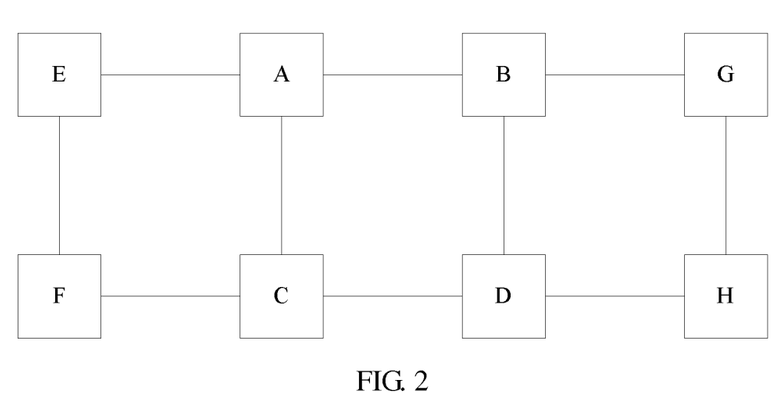
FIG. 2 is a schematic diagram of a topology of a wavelength division multiplexing network according to an embodiment of the present invention.

This embodiment of the present invention provides a method for monitoring optical performance of a wavelength channel. FIG. 2 shows a wavelength division multiplexing network, and connection lines between nodes represent optical fiber links. An operating wavelength of an unestablished wavelength channel Path1 is $\lambda_1$, and a route is A-C-D-H, where a node A is a sending node, a node H is a receiving node, and nodes D and C are nodes that add or drop wavelengths. For monitoring performance of the unestablished wavelength channel Path1, the method specifically includes the following steps:

Step 201: The node A generates an amplified spontaneous emission (Amplified Spontaneous Emission, ASE) signal by using an optical amplifier and obtains a noise signal over the operating wavelength $\lambda_1$ of the unestablished wavelength channel Path1 from the amplified spontaneous emission signal through filtering by using a tunable optical bandpass filter.

In this embodiment, the tunable optical bandpass filter may be implemented by using a TOF (Tunable Optical Filter, tunable optical filter) or a WSS (Wavelength Selective Switch, wavelength selective switch).

Step 202: The node A adjusts optical power of the noise signal over the operating wavelength $\lambda_1$ by using a variable optical attenuator (Variable Optical Attenuator, VOA) VOA0 at the node A until the noise signal over the operating wavelength is detected by a monitoring port of the optical amplifier 4 amplifies, by using the optical amplifier, the noise signal adjusted by the variable optical attenuator VOA0, and obtains an optical signal over the operating wavelength $\lambda_1$.

In this embodiment, the node A adjusts the optical power of the noise signal over the operating wavelength $\lambda_1$ by using the VOA0, so that noise power of the operating wavelength $\lambda_1$ is greater than a power threshold required for monitoring optical performance, so as to ensure that the node A can detect the noise signal at the monitoring port of the optical amplifier. Therefore, the node A adjusts the optical power of the noise signal over the operating wavelength $\lambda_1$, so that the optical power of the noise signal over the operating wavelength $\lambda_1$ satisfies the following condition: that the noise signal over the operating wavelength $\lambda_1$ is detected at the monitoring port of the optical amplifier.

In addition, the optical power of the noise signal over the operating wavelength $\lambda_1$ cannot be excessively large, so as to ensure that quality of a signal over a wavelength in an established wavelength channel is not affected and ensure that an OSNR margin of a corresponding operating wavelength at a receiving node of the established wavelength channel is greater than a margin threshold. Therefore, when the node A adjusts the optical power of the noise signal over the operating wavelength $\lambda_1$, another condition further needs to be satisfied: that the OSNR (Optical Signal Noise Ratio, optical signal noise ratio) margin of the corresponding operating wavelength detected by the receiving node of the established wavelength channel passing through the node A is greater than the margin threshold.

For example, established wavelength channels Path2 and Path3 are both established wavelength channels passing through the node A. As shown in FIG. 2, a route of the established wavelength channel Path2 is E-A-B-G, and an operating wavelength is $\lambda_2$; a route of the established wavelength channel Path3 is A-B-G-H, and an operating wavelength is $\lambda_3$. Therefore, it is required that an OSNR margin of the operating wavelength $\lambda_2$ detected by a receiving node G of the established wavelength channel Path2 is greater than a margin threshold, and an OSNR margin of the operating wavelength $\lambda_3$ detected by a receiving node H of the established wavelength channel Path3 is greater than a margin threshold.

The receiving node of the established wavelength channel may pass a value of the OSNR margin to the node A by using network management, a path signal, or the like; and the node A compares the OSNR margin with the margin threshold and then adjusts the optical power of the noise signal over the operating wavelength $\lambda_1$. The receiving node of the established wavelength channel may also pass a notification signal to the node A by using network management, a path signal, or the like when the OSNR margin is greater than the margin threshold, and the node A then adjusts the optical power of the noise signal over the operating wavelength $\lambda_1$ according to the notification signal.

The node A may adjust the optical power of the noise signal over the operating wavelength $\lambda_1$ in ascending order by using the VOA0 until the optical power of the noise signal over the operating wavelength $\lambda_1$ satisfies the foregoing two conditions.

The variable optical attenuator may be implemented by using an eVOA (electronically Variable Optical Attenuator, electronically variable optical attenuator).

Step 203: The node A establishes a cross-connection of the unestablished wavelength channel Path1.

The node A establishes the cross-connection of the unestablished wavelength channel Path1, so that the optical signal over the operating wavelength $\lambda_1$ is output to a sending end of the node A.

Step 204: The node A adjusts optical power of the optical signal over the operating wavelength $\lambda_1$ by using a variable optical attenuator VOA1 at the node A until the sending end of the node A detects the optical signal over the operating wavelength $\lambda_1$.

In this embodiment, the node A adjusts the optical power of the optical signal over the operating wavelength $\lambda_1$ in ascending order by using the variable optical attenuator VOA1 until the sending end of the node A detects the optical signal over the operating wavelength $\lambda_1$.

Step 205: After the node A establishes the cross-connection of the unestablished wavelength channel Path1, the node A sends the optical signal over the operating wavelength $\lambda_1$ to the adjacent downstream node C.

Step 206: The node C receives the optical signal over the operating wavelength $\lambda_1$ and establishes a cross-connection of the unestablished wavelength channel Path1.

The node C receives the optical signal over the operating wavelength $\lambda_1$ and establishes the cross-connection of the unestablished wavelength channel Path1, so that the optical signal over the operating wavelength $\lambda_1$ is output to a sending end of the node C.

Step 207: The node C adjusts the optical power of the optical signal over the operating wavelength $\lambda_1$ by using a variable optical attenuator VOA2 at the node C until the sending end of the node C detects the optical signal over the operating wavelength $\lambda_1$.

Further, if the node C adjusts the optical power of the optical signal over the operating wavelength $\lambda_1$ to a maximum value, the sending end of the node C still does not detect the optical signal over the operating wavelength $\lambda_1$, and the node C sends an adjustment signal to the adjacent upstream node A of the node C, so that the node A adjusts the optical power of the optical signal over the operating wavelength $\lambda_1$ to a larger value.

The node C may adjust the optical power of the optical signal over the operating wavelength $\lambda_1$ in ascending order by using the variable optical attenuator VOA2 until the sending end of the node C detects the optical signal over the operating wavelength $\lambda_1$. A maximum value of the optical power of the optical signal over the operating wavelength $\lambda_1$ is a budget gain value.

Step 208: After the node C establishes the cross-connection of the unestablished wavelength channel Path1, the node C sends the optical signal over the operating wavelength $\lambda_1$ to the adjacent downstream node D.

Step 209: The node D receives the optical signal over the operating wavelength $\lambda_1$ and establishes a cross-connection of the unestablished wavelength channel Path1.

The node D receives the optical signal over the operating wavelength $\lambda_1$ and establishes the cross-connection of the unestablished wavelength channel Path1, so that the optical signal over the operating wavelength $\lambda_1$ is output to a sending end of the node D.

Step 210: The node D adjusts the optical power of the optical signal over the operating wavelength $\lambda_1$ by using a variable optical attenuator VOA3 in the node D until the sending end of the node D detects the optical signal over the operating wavelength $\lambda_1$.

Further, if the node D adjusts the optical power of the optical signal over the operating wavelength $\lambda_1$ to a maximum value, the sending end of the node D still does not detect the optical signal over the operating wavelength $\lambda_1$, and the node D sends an adjustment signal to the adjacent upstream node C, so that the node C adjusts the optical power of the optical signal over the operating wavelength $\lambda_1$ to a larger value, and so that the sending end of the node D detects the optical signal over the operating wavelength $\lambda_1$.

Further, if the node C adjusts the optical power of the optical signal over the operating wavelength $\lambda_1$ to the maximum value, the sending end of the node D still does not detect the optical signal over the operating wavelength $\lambda_1$, and the node D sends an adjustment signal to the node A, so that the node A adjusts the optical power of the optical signal over the operating wavelength $\lambda_1$ to a larger value, and so that the sending end of the node D detects the optical signal over the operating wavelength $\lambda_1$.

The node D may adjust the optical power of the optical signal over the operating wavelength $\lambda_1$ in ascending order by using the variable optical attenuator VOA3 until the sending end of the node D detects the optical signal over the operating wavelength $\lambda_1$.

Step 211: After the node D establishes the cross-connection of the unestablished wavelength channel Path1, the node D sends the optical signal over the operating wavelength $\lambda_1$ to the adjacent downstream node H.

Step 212: The node H receives the optical signal over the operating wavelength $\lambda_1$ and establishes a cross-connection of the unestablished wavelength channel Path1.

The node H receives the optical signal over the operating wavelength $\lambda_1$ and establishes the cross-connection of the unestablished wavelength channel Path1, so that the optical signal over the operating wavelength $\lambda_1$ is output to a sending end of the node H.

Step 213: The node H adjusts the optical power of the optical signal over the operating wavelength $\lambda_1$ by using a variable optical attenuator VOA4 at the node H so that the sending end of the node H detects the optical signal over the operating wavelength $\lambda_1$.

Further, if the node H adjusts the optical power of the optical signal over the operating wavelength $\lambda_1$ to a maximum value, the sending end of the node H still does not detect the optical signal over the operating wavelength $\lambda_1$, and the node H sends an adjustment signal to the adjacent upstream node D of the node H, so that the node D adjusts the optical power of the optical signal over the operating wavelength $\lambda_1$ to a larger value, and so that the sending end of the node H detects the optical signal over the operating wavelength $\lambda_1$.

Further, if the node D adjusts the optical power of the optical signal over the operating wavelength $\lambda_1$ to the maximum value, the sending end of the node H still does not detect the optical signal over the operating wavelength $\lambda_1$, and the node H sends an adjustment signal to the node C, so that the node C adjusts the optical power of the optical signal over the operating wavelength $\lambda_1$ to a larger value, and so that the sending end of the node H detects the optical signal over the operating wavelength $\lambda_1$.

Further, if the node C adjusts the optical power of the optical signal over the operating wavelength $\lambda_1$ to the maximum value, the sending end of the node H still does not detect the optical signal over the operating wavelength $\lambda_1$, and the node H sends an adjustment signal to the node A, so that the node A adjusts the optical power of the optical signal over the operating wavelength $\lambda_1$ to a larger value, and so that the sending end of the node H detects the optical signal over the operating wavelength $\lambda_1$.

The node H may adjust the optical power of the optical signal over the operating wavelength $\lambda_1$ in ascending order by using the variable optical attenuator VOA4 until the sending end of the node H detects the optical signal over the operating wavelength $\lambda_1$.

Step S214: One or more nodes on the route of the unestablished wavelength channel Path1 obtain optical performance of the unestablished wavelength channel Path1 by monitoring the optical signal over the operating wavelength $\lambda_1$.

The nodes on the route of the unestablished wavelength channel Path1 include the node A, the node C, the node D, and the node H. The node A monitors optical performance of the unestablished wavelength channel Path1 at the sending end of the node A; the nodes C, D, and H may monitor optical performance of the unestablished wavelength channel Path1 at respective receiving ends or sending ends, and may also monitor optical performance of the unestablished wavelength channel Path1 at both the respective receiving ends and the respective sending ends.

In another embodiment, based on steps 201 to 214 in the foregoing Embodiment 1, real-time performance monitoring of a plurality of unestablished wavelength channels can be implemented. For example, for operating wavelengths $\lambda_1$, $\lambda_4$, and $\lambda_5$ of the unestablished wavelength channels, the operating wavelength $\lambda_1$ in the foregoing Embodiment 1 is replaced with the operating wavelengths $\lambda_1$, $\lambda_4$, and $\lambda_5$. Noise signals over the three operating wavelengths $\lambda_1$, $\lambda_4$, and $\lambda_5$ corresponding to three unestablished wavelength channels are enhanced at the same time, and optical signals over the operating wavelengths of the three unestablished wavelength channels are constructed for the three unestablished wavelength channels. In this case, the tunable optical bandpass filter needs to be implemented by using the WSS, so as to obtain the noise signals over the three operating wavelengths $\lambda_1$, $\lambda_4$, and $\lambda_5$ at the same time through filtering.

In still another embodiment, the foregoing steps 201 to 214 may be performed, in a polling manner, on all unestablished wavelength channels using the node A as a sending node, to implement real-time performance monitoring of the unestablished wavelength channels.

A cross-connection and an adjusted value of optical power of each unestablished wavelength channel may be further recorded when the foregoing steps 201 to 214 are performed in a polling manner. When a service subscription request occurs, a latest recorded cross-connection and adjusted value of the optical power are used as optical parameter input values of network management software to perform link configuration of a wavelength channel on which a service is to be subscribed, thereby implementing online preconfiguration of the unestablished wavelength channel.

In a method for monitoring optical performance of a wavelength channel provided by this embodiment of the present invention, no external light source is required; by enhancing the noise signal over the operating wavelength of the unestablished wavelength channel, the optical signal over the operating wavelength of the unestablished wavelength channel is constructed for the unestablished wavelength channel; and a process of adjusting the optical power can be automatically completed. In this way, dynamic monitoring of the optical performance of the unestablished wavelength channel is implemented, and the implementation is simple and reliability is high.

In addition, optical performance of all unestablished wavelength channels using a certain node as a sending node are monitored in a polling manner, thereby implementing real-time dynamic monitoring of optical performance of the unestablished wavelength channels. Besides, by recording parameters during a real-time monitoring process, online preconfiguration of the unestablished wavelength channels can be implemented.

Embodiment 2

Figure 3:
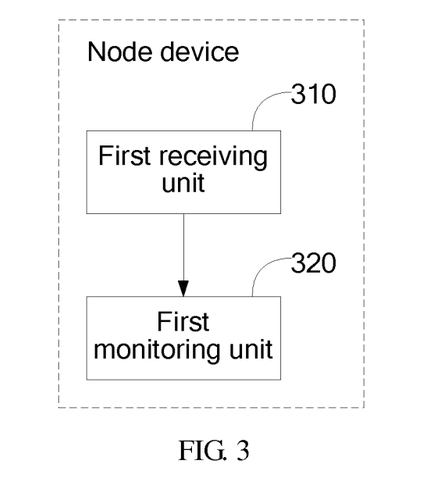
FIG. 3 is a structural block diagram of a node device according to an embodiment of the present invention.

The embodiment of the present invention provides a node device. As shown in FIG. 3, the node device includes:

a first receiving unit 310, configured to receive an optical signal over an operating wavelength of an unestablished wavelength channel, where the optical signal is obtained by a second node device by using an optical amplifier to amplify a noise signal adjusted by a second variable optical attenuator, the adjusted noise signal is obtained by the second node device by using the second variable optical attenuator to adjust optical power of a noise signal over the operating wavelength, the noise signal over the operating wavelength is obtained through filtering from an amplified spontaneous emission signal by the second node device by using a tunable optical bandpass filter, and the amplified spontaneous emission signal is generated by the second node device by using the optical amplifier; and a first monitoring unit 320, configured to obtain optical performance of the unestablished wavelength channel by monitoring the optical signal at a receiving end.

Embodiment 3

Figure 4:
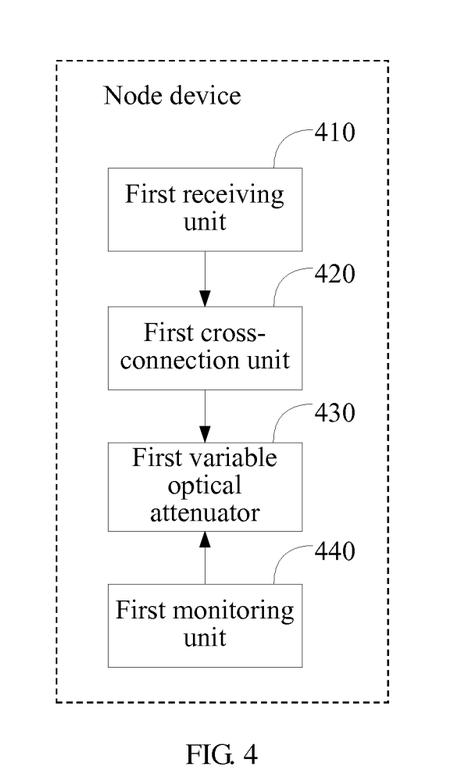
FIG. 4 is a structural block diagram of a node device according to another embodiment of the present invention.

The embodiment of the present invention provides a node device. As shown in FIG. 4, the node device includes:

a first receiving unit 410, configured to receive an optical signal over an operating wavelength of an unestablished wavelength channel, where the optical signal is obtained by a second node device by using an optical amplifier to amplify a noise signal adjusted by a second variable optical attenuator, the adjusted noise signal is obtained by the second node device by using the second variable optical attenuator to adjust optical power of a noise signal over the operating wavelength, the noise signal over the operating wavelength is obtained through filtering from an amplified spontaneous emission signal by the second node device by using a tunable optical bandpass filter, and the amplified spontaneous emission signal is generated by the second node device by using the optical amplifier;

a first cross-connection unit 420, configured to establish a cross-connection of the unestablished wavelength channel;

a first variable optical attenuator 430, configured to adjust optical power of the optical signal and stop the adjustment when a valid first control signal is obtained; and a first monitoring unit 440, configured to: when a sending end of the node device detects the optical signal, generate the valid first control signal; and configured to obtain optical performance of the unestablished wavelength channel by monitoring the optical signal at the sending end.

Further, the first monitoring unit 440 may further be configured to: after the first receiving unit receives the optical signal, obtain the optical performance of the unestablished wavelength channel by monitoring the optical signal at a receiving end.

Further, the node device may further include a first sending unit 450, configured to: if the node device adjusts the optical power of the optical signal to a maximum value, the sending end still does not detect the optical signal, and send an adjustment signal to an adjacent upstream node device, so that the adjacent upstream node device adjusts the optical power of the optical signal to a larger value.

Further, the first sending unit 450 may be further configured to: after the cross-connection of the unestablished wavelength channel is established, send the optical signal to an adjacent downstream node device.

Embodiment 4

Figure 5:
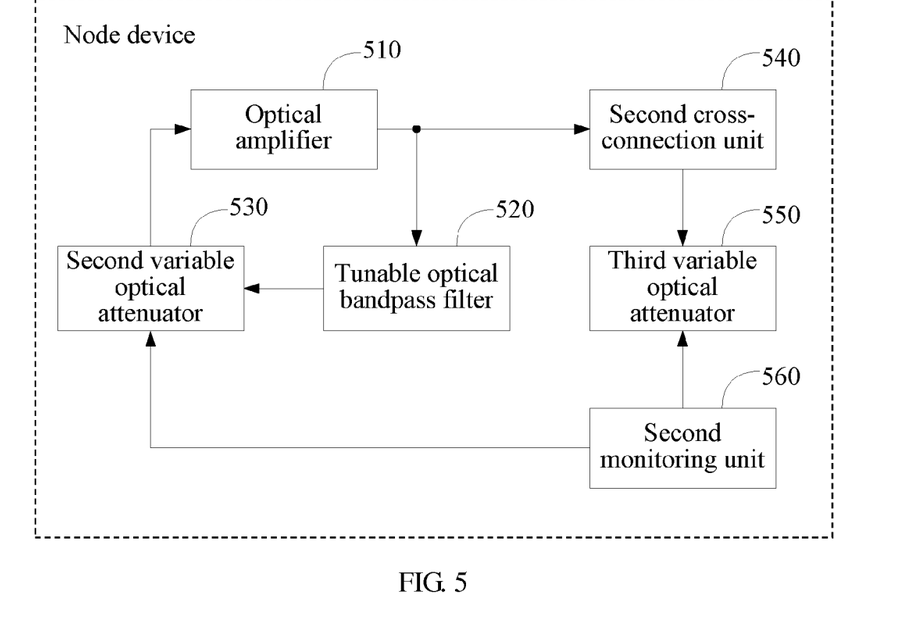
FIG. 5 is a structural block diagram of a node device according to still another embodiment of the present invention.

The embodiment of the present invention provides a node device. As shown in FIG. 5, the node device includes:

an optical amplifier 510, configured to generate an amplified spontaneous emission signal; and configured to amplify a noise signal adjusted by a second variable optical attenuator and obtain an optical signal over an operating wavelength of an unestablished wavelength channel;

a tunable optical bandpass filter 520, configured to obtain a noise signal over the operating wavelength from the amplified spontaneous emission signal through filtering, where the tunable optical bandpass filter 520 may be implemented by using a TOF (Tunable Optical Filter, tunable optical filter) or a WSS (Wavelength Selective Switch, wavelength selective switch);

a second variable optical attenuator 530, configured to adjust optical power of the noise signal over the operating wavelength until a second control signal is valid, where the optical power of the noise signal over the operating wavelength may be adjusted in ascending order until the second control signal is valid;

a second cross-connection unit 540, configured to establish a cross-connection of the unestablished wavelength channel;

a third variable optical attenuator 550, configured to adjust optical power of the optical signal until a third control signal is valid, where the optical power of the optical signal may be adjusted in ascending order until the third control signal is valid; and a second monitoring unit 560, configured to: when the noise signal over the operating wavelength is detected by a monitoring port of the optical amplifier, generate the valid second control signal; configured to: when a sending end of the node device detects the optical signal, generate the valid third control signal; and configured to obtain optical performance of the unestablished wavelength channel by monitoring the optical signal at the sending end.

The second variable optical attenuator 530 and the third variable optical attenuator 550 may be implemented by using an eVOA (electronically Variable Optical Attenuator, electronically variable optical attenuator).

Further, a condition on which the second monitoring unit 560 generates the valid second control signal may further include: that an optical signal noise ratio margin of a corresponding operating wavelength detected by a receiving node device of an established wavelength channel passing through the node device is greater than a margin threshold.

Further, the node device may further include a second sending unit 570, configured to: after the second cross-connection unit establishes the cross-connection of the unestablished wavelength channel, send the optical signal to an adjacent downstream node device.

The node devices in the foregoing Embodiment 2, Embodiment 3, and Embodiment 4 may be transport equipment, for example, wavelength division multiplexing equipment. Content such as information exchange between the modules in the node devices and execution processes in Embodiment 2, Embodiment 3, and Embodiment 4 is based on a same idea as that of the method embodiments of the present invention, and therefore, for specific content, refer to the description in the method embodiments of the present invention, which is not repeated herein.

In a node device provided by this embodiment of the present invention, no external light source is required; by enhancing the noise signal over the operating wavelength of the unestablished wavelength channel, the optical signal over the operating wavelength of the unestablished wavelength channel is constructed for the unestablished wavelength channel; and a process of adjusting the optical power can be automatically completed. In this way, dynamic monitoring of the optical performance of the unestablished wavelength channel is implemented, and the implementation is simple and reliability is high.

Embodiment 5

Figure 6:
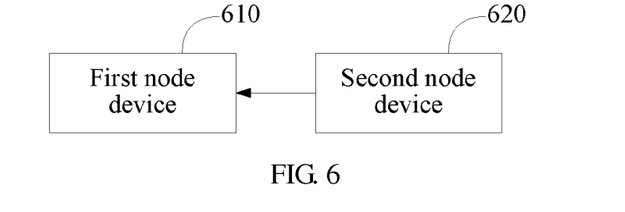
FIG. 6 is a schematic diagram of a system for monitoring optical performance of a wavelength channel according to an embodiment of the present invention.

This embodiment of the present invention provides a system for monitoring optical performance of a wavelength channel. As shown in FIG. 6, the system includes at least a first node device 610 and a second node device 620, where the second node device 620 is a sending node on an unestablished wavelength channel, and the first node device 610 is a non-sending node on the unestablished wavelength channel.

The first node device 610 is configured to receive an optical signal over an operating wavelength of the unestablished wavelength channel; and configured to obtain optical performance of the unestablished wavelength channel by monitoring the optical signal at a receiving end of the first node device 610.

The first node device 610 may include: a first receiving unit and a first monitoring unit. For specific content, refer to the first receiving unit 310 and the first monitoring unit 320 in Embodiment 2, which is not repeated herein.

The second node device 620 is configured to generate an amplified spontaneous emission signal by using an optical amplifier; configured to obtain a noise signal over the operating wavelength from the amplified spontaneous emission signal through filtering by using a tunable optical bandpass filter; configured to adjust optical power of the noise signal over the operating wavelength by using a second variable optical attenuator until the noise signal over the operating wavelength is detected by a monitoring port of the optical amplifier; configured to amplify, by using the optical amplifier, the noise signal adjusted by the second variable optical attenuator, and obtain an optical signal over the operating wavelength; configured to establish a cross-connection of the unestablished wavelength channel; configured to adjust optical power of the optical signal by using a third variable optical attenuator until a sending end of the second node device 620 detects the optical signal; and configured to: after the cross-connection of the unestablished wavelength channel is established, send the optical signal to an adjacent downstream node device.

The second node device 620 may include an optical amplifier, a tunable optical bandpass filter, a second variable optical attenuator, a second cross-connection unit, a third variable optical attenuator, and a second sending unit. For specific content, refer to the optical amplifier 510, the tunable optical bandpass filter 520, the second variable optical attenuator 530, the second cross-connection unit 540, the third variable optical attenuator 550, and the second sending unit 570 in Embodiment 4, which is not repeated herein.

Embodiment 6

This embodiment of the present invention provides a system for monitoring optical performance of a wavelength channel. As shown in FIG. 6, the system includes at least a first node device 610 and a second node device 620, where the second node device 620 is a sending node on an unestablished wavelength channel, and the first node device 610 is a non-sending node on the unestablished wavelength channel.

The first node device 610 is configured to receive an optical signal over an operating wavelength of the unestablished wavelength channel; configured to establish a cross-connection of the unestablished wavelength channel; configured to adjust optical power of the optical signal by using a first variable optical attenuator until a sending end of the first node device 610 detects the optical signal; and configured to obtain optical performance of the unestablished wavelength channel by monitoring the optical signal at the sending end of the first node device.

The first node device 610 may include: a first receiving unit, a first cross-connection unit, a first variable optical attenuator, and a first monitoring unit. For specific content, refer to the first receiving unit 410, the first cross-connection unit 420, the first variable optical attenuator 430, and the first monitoring unit 440 in Embodiment 3, which is not repeated herein.

The second node device 620 is configured to generate an amplified spontaneous emission signal by using an optical amplifier; configured to obtain a noise signal over the operating wavelength from the amplified spontaneous emission signal through filtering by using a tunable optical bandpass filter; configured to adjust optical power of the noise signal over the operating wavelength by using a second variable optical attenuator until the noise signal over the operating wavelength is detected by a monitoring port of the optical amplifier; configured to amplify, by using the optical amplifier, the noise signal adjusted by the second variable optical attenuator, and obtain an optical signal over the operating wavelength; configured to establish a cross-connection of the unestablished wavelength channel; configured to adjust optical power of the optical signal by using a third variable optical attenuator until a sending end of the second node device 620 detects the optical signal; and configured to: after the cross-connection of the unestablished wavelength channel is established, send the optical signal to an adjacent downstream node device.

The second node device 620 may include an optical amplifier, a tunable optical bandpass filter, a second variable optical attenuator, a second cross-connection unit, a third variable optical attenuator, and a second sending unit. For specific content, refer to the optical amplifier 510, the tunable optical bandpass filter 520, the second variable optical attenuator 530, the second cross-connection unit 540, the third variable optical attenuator 550, and the second sending unit 570 in Embodiment 4, which is not repeated herein.

Further, a third node device 630 may further exist between the first node device 610 and the second node device 620, which may specifically be that:

the third node device 630 is configured to receive the optical signal over the operating wavelength of the unestablished wavelength channel; configured to establish a cross-connection of the unestablished wavelength channel; configured to adjust optical power of the optical signal by using a fourth variable optical attenuator until a sending end of the third node device 630 detects the optical signal; and configured to: after the cross-connection of the unestablished wavelength channel is established, send the optical signal to an adjacent downstream node device.

The third node device 630 may include: a third receiving unit, a third cross-connection unit, a fourth variable optical attenuator, and a third sending unit. For specific content, refer to the first receiving unit 410, the first cross-connection unit 420, the first variable optical attenuator 430, and the first sending unit 450 in Embodiment 3, which is not repeated herein.

By adopting the technical solutions provided by the embodiments of the present invention, no external light source is required; by enhancing the noise signal over the operating wavelength of the unestablished wavelength channel, the optical signal over the operating wavelength of the unestablished wavelength channel is constructed for the unestablished wavelength channel; and a process of adjusting the optical power can be automatically completed. In this way, dynamic monitoring of the optical performance of the unestablished wavelength channel is implemented, and the implementation is simple and reliability is high.

A person of ordinary skill in the art may understand that all or a part of the steps of the method embodiments may be implemented by a computer program instructing relevant hardware. The program may be stored in a computer readable storage medium. When the program runs, the processes of the method embodiments are performed. The storage medium may be a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for monitoring optical performance of a wavelength channel, comprising:

receiving, by a first node, an optical signal over an operating wavelength, wherein the operating wavelength is the wavelength of an unestablished wavelength channel, the optical signal is obtained by a second node by using an optical amplifier to amplify a noise signal adjusted by a second variable optical attenuator, the adjusted noise signal is obtained by the second node by using the second variable optical attenuator to adjust optical power of a noise signal over the operating wavelength, the noise signal over the operating wavelength is obtained from an amplified spontaneous emission signal through filtering by the second node by using a tunable optical bandpass filter, and the amplified spontaneous emission signal is generated by the second node by using the optical amplifier; and obtaining, by the first node, optical performance of the unestablished wavelength channel by monitoring the optical signal at a receiving end.

2. A method for monitoring optical performance of a wavelength channel, comprising:

receiving, by a first node, an optical signal over an operating wavelength, wherein the operating wavelength is the wavelength of an unestablished wavelength channel, the optical signal is obtained by a second node by using an optical amplifier to amplify a noise signal adjusted by a second variable optical attenuator, the adjusted noise signal is obtained by the second node by using the second variable optical attenuator to adjust optical power of a noise signal over the operating wavelength, the noise signal over the operating wavelength is obtained from an amplified spontaneous emission signal through filtering by the second node by using a tunable optical bandpass filter, and the amplified spontaneous emission signal is generated by the second node by using the optical amplifier;

establishing, by the first node, a cross-connection of the unestablished wavelength channel;

adjusting, by the first node, optical power of the optical signal by using a first variable optical attenuator until a sending end of the first node detects the optical signal; and obtaining, by the first node, optical performance of the unestablished wavelength channel by monitoring the optical signal at the sending end.

3. The method according to claim 2, wherein the method further comprises:

after the first node receives the optical signal, obtaining, by the first node, optical performance of the unestablished wavelength channel by monitoring the optical signal at a receiving end.

4. The method according to claim 2, wherein the method further comprises:

if the first node adjusts the optical power of the optical signal to a maximum value, the sending end still does not detect the optical signal, sending, by the first node, an adjustment signal to an adjacent upstream node, so that the adjacent upstream node adjusts the optical power of the optical signal to a larger value.

5. The method according to claim 2, wherein the method further comprises:

after the first node establishes the cross-connection of the unestablished wavelength channel, sending the optical signal to an adjacent downstream node.

6. A method for monitoring optical performance of a wavelength channel, comprising:

generating, by a second node, an amplified spontaneous emission signal by using an optical amplifier;

obtaining, by the second node, a noise signal over an operating wavelength from the amplified spontaneous emission signal through filtering by using a tunable optical bandpass filter, wherein the operating wavelength is the wavelength of an unestablished wavelength channel;

adjusting, by the second node, optical power of the noise signal over the operating wavelength by using a second variable optical attenuator until a condition is satisfied, wherein the condition comprises: that the noise signal over the operating wavelength is detected by a monitoring port of the optical amplifier;

amplifying, by the second node by using the optical amplifier, the noise signal adjusted by the second variable optical attenuator, and obtaining an optical signal over the operating wavelength;

establishing, by the second node, a cross-connection of the unestablished wavelength channel;

adjusting, by the second node, optical power of the optical signal by using a third variable optical attenuator until a sending end of the second node detects the optical signal; and obtaining, by the second node, optical performance of the unestablished wavelength channel by monitoring the optical signal at the sending end.

7. The method according to claim 6, wherein the condition further comprises:

that an optical signal noise ratio margin of a corresponding operating wavelength detected by a receiving node of an established wavelength channel passing through the second node is greater than a margin threshold.

8. The method according to claim 6, wherein the method further comprises:

after the second node establishes the cross-connection of the unestablished wavelength channel, sending the optical signal to an adjacent downstream node.

9. A node device, comprising, a first receiving unit; and a first monitoring unit, wherein:

the first receiving unit is configured to receive an optical signal over an operating wavelength, wherein the operating wavelength is the wavelength of an unestablished wavelength channel, the optical signal is obtained by a second node device by using an optical amplifier to amplify a noise signal adjusted by a second variable optical attenuator, the adjusted noise signal is obtained by the second node device by using the second variable optical attenuator to adjust optical power of a noise signal over the operating wavelength, the noise signal over the operating wavelength is obtained through filtering from an amplified spontaneous emission signal by the second node device by using a tunable optical bandpass filter, and the amplified spontaneous emission signal is generated by the second node device by using the optical amplifier; and the first monitoring unit is configured to obtain optical performance of the unestablished wavelength channel by monitoring the optical signal at a receiving end.

10. A node device, comprising a first receiving unit, a first cross-connection unit, a first variable optical attenuator, and a first monitoring unit, wherein:

the first receiving unit is configured to receive an optical signal over an operating wavelength, wherein the operating wavelength is the wavelength of an unestablished wavelength channel, the optical signal is obtained by a second node device by using an optical amplifier to amplify a noise signal adjusted by a second variable optical attenuator, the adjusted noise signal is obtained by the second node device by using the second variable optical attenuator to adjust optical power of a noise signal over the operating wavelength, the noise signal over the operating wavelength is obtained through filtering from an amplified spontaneous emission signal by the second node device by using a tunable optical bandpass filter, and the amplified spontaneous emission signal is generated by the second node device by using the optical amplifier;

the first cross-connection unit is configured to establish a cross-connection of the unestablished wavelength channel;

the first variable optical attenuator is configured to adjust optical power of the optical signal and stop the adjustment when a valid first control signal is obtained; and the first monitoring unit is configured to: when a sending end of the node device detects the optical signal, generate the valid first control signal; and configured to obtain optical performance of the unestablished wavelength channel by monitoring the optical signal at the sending end.

11. The node device according to claim 10, wherein the first monitoring unit is further configured to: after the first receiving unit receives the optical signal, obtain the optical performance of the unestablished wavelength channel by monitoring the optical signal at a receiving end.

12. The node device according to claim 10, wherein the node device further comprises:
a first sending unit, configured to: if the node device adjusts the optical power of the optical signal to a maximum value, the sending end still does not detect the optical signal, and send an adjustment signal to an adjacent upstream node device, so that the adjacent upstream node device adjusts the optical power of the optical signal to a larger value.

13. The node device according to claim 10, wherein the first sending unit is further configured to: after the cross-connection of the unestablished wavelength channel is established, send the optical signal to an adjacent downstream node device.

14. A node device, comprising:
an optical amplifier;
a tunable optical bandpass;
a second variable optical attenuator;
a second cross-connection unit;
a third variable optical attenuator; and
a second monitoring unit, wherein:
the optical amplifier is configured to generate an amplified spontaneous emission signal;
and configured to amplify a noise signal adjusted by the second variable optical attenuator and obtain an optical signal over an operating wavelength, wherein the operating wavelength is the wavelength of an unestablished wavelength channel;
the tunable optical bandpass filter is configured to obtain a noise signal over the operating wavelength from the amplified spontaneous emission signal through filtering;
the second variable optical attenuator is configured to adjust optical power of the noise signal over the operating wavelength until a second control signal is valid;
the second cross-connection unit is configured to establish a cross-connection of the unestablished wavelength channel;
the third variable optical attenuator is configured to adjust optical power of the optical signal until a third control signal is valid; and
the second monitoring unit is configured to: when the noise signal over the operating wavelength is detected by a monitoring port of the optical amplifier, generate the valid second control signal; configured to: when a sending end of the node device detects the optical signal, generate the valid third control signal; and configured to obtain optical performance of the unestablished wavelength channel by monitoring the optical signal at the sending end.

15. The node device according to claim 14, wherein the condition on which the second monitoring unit generates the valid second control signal further comprises: that an optical signal noise ratio margin of a corresponding operating wavelength detected by a receiving node device of an established wavelength channel passing through the node device is greater than a margin threshold.

16. The node device according to claim 14, wherein the node device further comprises:
a second sending unit, configured to: after the second cross-connection unit establishes the cross-connection of the unestablished wavelength channel, send the optical signal to an adjacent downstream node device.

* * * * *

UNITED STATES PATENT AND TRADEMARK OFFICE
CERTIFICATE OF CORRECTION

PATENT NO.        : 9,531,470 B2  
APPLICATION NO.   : 14/521956  
DATED             : December 27, 2016  
INVENTOR(S)       : Enbo Zhou et al.

Page 1 of 1

It is certified that error appears in the above-identified patent and that said Letters Patent is hereby corrected as shown below:

In the Claims

Column 19, Line 19, Claim 14:
After "bandpass" insert -- filter --, therefor.

Signed and Sealed this
Fourteenth Day of March, 2017

Michelle K. Lee
*Director of the United States Patent and Trademark Office*